United States Patent
Tsunekawa et al.

(10) Patent No.: US 9,440,505 B2
(45) Date of Patent: Sep. 13, 2016

(54) SUSPENSION DEVICE FOR A VEHICLE

(71) Applicant: TOYOTA JIDOSHA KABUSHIKI KAISHA, Toyota-shi, Aichi (JP)

(72) Inventors: Hajime Tsunekawa, Aisai (JP); Tomohito Enomoto, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 14/836,486

(22) Filed: Aug. 26, 2015

(65) Prior Publication Data

US 2016/0075207 A1    Mar. 17, 2016

(30) Foreign Application Priority Data

Sep. 16, 2014 (JP) ................................. 2014-187968

(51) Int. Cl.
| | |
|---|---|
| *B60G 11/14* | (2006.01) |
| *B60G 15/06* | (2006.01) |
| *F16F 9/38* | (2006.01) |

(52) U.S. Cl.
CPC ............. *B60G 11/14* (2013.01); *B60G 15/062* (2013.01); *F16F 9/38* (2013.01); *B60G 2202/12* (2013.01); *B60G 2204/4308* (2013.01)

(58) Field of Classification Search
CPC ........ B60G 99/00; B60G 3/01; B60G 11/14; B60G 2202/12; B60G 2204/4308
See application file for complete search history.

(56) References Cited

U.S. PATENT DOCUMENTS

| | | | | |
|---|---|---|---|---|
| 6,749,047 | B2* | 6/2004 | Koyano | F16F 9/38 188/321.11 |
| 2003/0006574 | A1* | 1/2003 | Momose | B60G 15/063 280/124.155 |
| 2003/0057041 | A1 | 3/2003 | Koyano et al. | |
| 2003/0209395 | A1* | 11/2003 | Fukaya | B60G 11/14 188/322.12 |
| 2013/0113145 | A1* | 5/2013 | Abe | B60G 15/068 267/220 |
| 2015/0091257 | A1* | 4/2015 | Matsumura | F16F 9/38 277/636 |

FOREIGN PATENT DOCUMENTS

| | | | | |
|---|---|---|---|---|
| JP | S57-129942 | A | 8/1982 | |
| JP | 2001-234967 | A | 8/2001 | |
| JP | 2005265155 | A * | 9/2005 | ............... F16F 9/54 |
| JP | 2008267432 | A * | 11/2008 | ............... F16F 9/38 |
| JP | 2014-009768 | A | 1/2014 | |
| JP | 2014-105793 | A | 6/2014 | |

\* cited by examiner

*Primary Examiner* — Faye M Fleming
(74) *Attorney, Agent, or Firm* — Oliff PLC (57) ABSTRACT

1. Objective:
Endurance of a dust cover 50 mounted on a suspension device wherein a top spring seat 85 is formed to be inclined to an axis of a shock absorber 10 and disposed rotatably about a top seat axis inclined to an axis of a shock absorber 10 is improved.
2. Means for Solution:
The suspension device comprises a rotation prevention portion 100 so that the dust cover 50 cannot rotate relatively a top seat portion 90 about an axis of the top seat portion 90. The rotation prevention portion 100 comprises two convex portions 110 formed in the top seat portion 90 and two concave portions 120 formed in a top connecting portion 60 of the dust cover 50.

1 Claim, 5 Drawing Sheets

SUSPENSION DEVICE FOR A VEHICLE

BACKGROUND OF THE INVENTION

1. Field of the Invention

The present invention relates to a suspension device for a vehicle, especially to a mounting structure of a dust cover which covers the surroundings of a shock absorber.

2. Description of the Related Art

For instance, a strut-type suspension comprises a shock absorber disposed between a wheel and a vehicle body, and a coil spring wound on the outer periphery side of this shock absorber. The coil spring is mounted between a top spring seat disposed on the side of a structure which supports the vehicle body and a bottom spring seat disposed on the cylinder sheath side of the shock absorber, for example. Moreover, in order to protect the oil seal of the shock absorber from foreign matters, such as sand, a dust cover is disposed between the shock absorber and the coil spring. As for the dust cover disclosed in the patent document 1, its top end is fixed to the top spring seat and its bottom end is fixed to the bottom spring seat.

CITATION LIST

Patent Literature

[Patent Document 1] Japanese Patent Application Laid-Open (kokai) No. 57-129942

SUMMARY OF THE INVENTION

In a suspension disposed on a steered wheel, a top spring seat can rotate about the axis of a shock absorber. For this reason, a dust cover needs to be attached so that it may not interfere with a relative rotation of the top spring seat and the bottom spring seat, and so that a dust cover may not be deformed by the above-mentioned relative rotation. In this case, in order to make it easy to mount a dust cover, for example, a configuration wherein the top end of a dust cover is rotatably fitted into an inner circumference portion of a top spring seat and the bottom end of the dust cover is rotatably fitted into a cylinder side member (the bottom spring seat may be sufficient) fixed to the cylinder sheath side can be employed.

However, when a top spring seat is disposed to be inclined to the axis of a shock absorber, the following issues will arise.

When a shock absorber expands and contracts, a coil spring also expands and contracts accordingly. When the coil spring makes this expansion and contraction movement, the winding seat portions on an upper end side and a lower end side of the coil spring make a repetitive rotational movement about a coil axis relatively. The winding seat portions on the upper end side and lower end side of the coil spring are respectively fixed to a top spring seat and a bottom spring seat through an insulator so that they may not slide over the spring seats. Therefore, when the coil spring makes an expansion and contraction movement, a top spring seat is made to repetitively rotate about the axis in connection therewith.

In a configuration wherein an upper end of a dust cover is rotatably fitted into an inner circumference portion of the top spring seat, the dust cover also repetitively rotate in association with the top spring seat by the friction in a fitting portion. When the expansion and contraction movement of the coil spring finishes, the top spring seat will certainly return to an initial rotational position according to the restoring force of the coil spring. On the other hand, the dust cover repetitively rotates while sliding over the fitting portions on its upper end and lower end during the expansion and contraction movement of the coil spring. Furthermore, since the extent of a friction at the fitting portion when rotating in one direction is not necessarily completely the same as that when rotating in the other direction, the amount of slide in one rotational direction may be larger or smaller than the amount of slide in the other rotational direction. As a result, the position of the dust cover with respect to the top spring seat rotationally shifts from its initial position to one direction or the other little by little whenever the expansion and contraction movement of the coil spring is performed.

Figure 7:
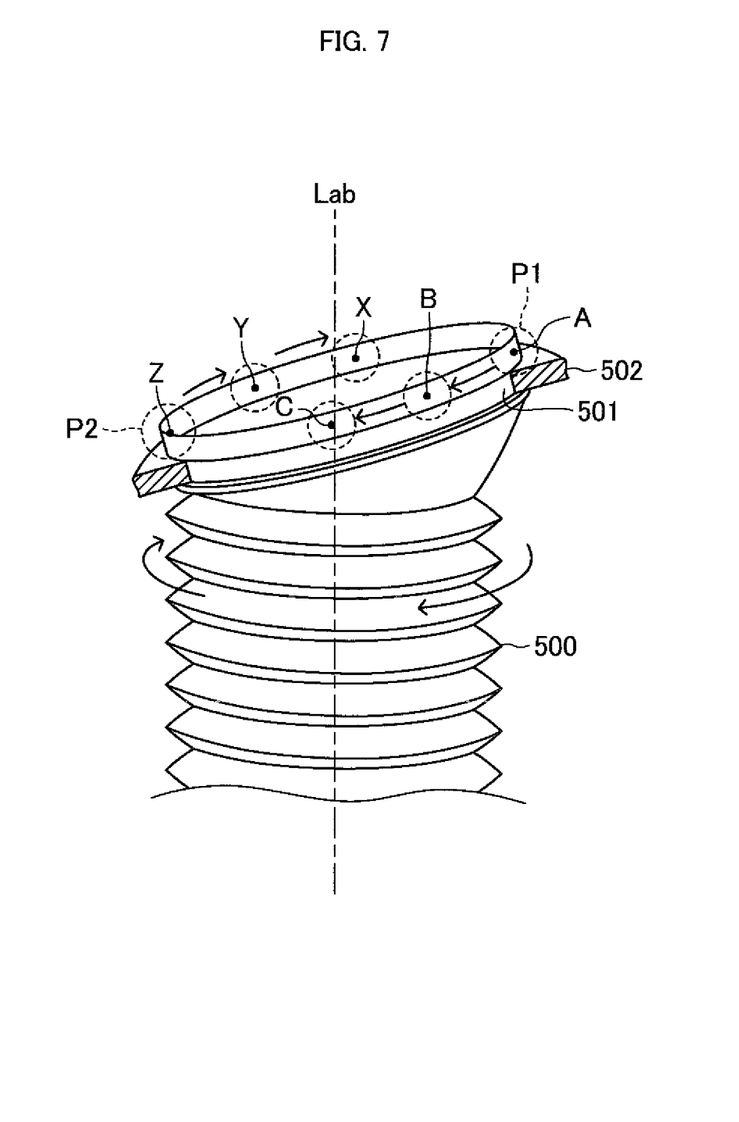
FIG. 7 is a diagram for explaining a rotation of a dust cover.

The shift of the rotational position of the dust cover is be perfectly acceptable when the top spring seat is disposed to perpendicularly intersect with the axis of the shock absorber. However, as shown in FIG. 7, in a configuration wherein a top spring seat 502 is prepared to be inclined to an axis Lab of a shock absorber, an upper end fitting portion 501 of the dust cover 500 is also disposed to be inclined to a plane perpendicular to the axis Lab of the shock absorber. For this reason, when the dust cover 500 rotates relatively to the top spring seat 502 as mentioned above, a portion P1 which should be located at the uppermost position in the upper end fitting portion 501 of the dust cover 500 gradually shifts from A point which is a proper location to B point, and further to C point. At the same time, a portion P2 which should be located at the lowermost position in the upper end fitting portion 501 of the dust cover 500 gradually shifts from Z point which is a proper location to Y point, and further to X point.

In association with this position shift, load acts in a direction in which the coil spring expands on the P1 side (region extending to the axial direction from P1), while it acts in a direction in which the coil spring contracts on the P2 side (region extending to the axial direction from P2) in the dust cover 500. For this reason, the load acting on the dust cover 500 becomes uneven along a circumferential direction, and a strain arises in the dust cover 500. When the shock absorber expands and contracts (a coil spring expands and contracts) by a vertical vibration of a vehicle body in this status, the dust cover 500 will be expanded and contracted more than expected in its design, and its endurance will fall.

The present invention has been made in order to cope with the above-mentioned problem, and one of its objectives is to improve the endurance of a dust cover.

In order to attain the above-mentioned objective, an aspect of the present invention is a suspension device for a vehicle comprising:

a shock absorber (10) disposed between a wheel and a vehicle body, a coil spring (30) disposed between a top spring seat (90) in a shape of a ring and a bottom spring seat (18) in a shape of a ring, said top spring seat (90) is disposed on the side of a structure (15, 17, 81) which supports said vehicle body and said bottom spring seat (18) is disposed on a cylinder sheath (11) side of said shock absorber, and a dust cover (50) disposed between said shock absorber and said coil spring, said dust cover is elastically deformable and is in a shape of bellows tube, wherein:

said top spring seat (90) is formed so that a supporting surface which supports an upper end of said coil spring through an insulator is inclined to an axis of said shock absorber and said top spring seat is disposed rotatably about a top seat axis inclined to said axis of said shock absorber, a lower end (70) of said dust cover is attached to a sheath side member (20) rotatably about an axis of said shock absorber, by being fitted into said sheath side member fixed and disposed on said cylinder sheath side, an upper end (60) of said dust cover is attached to said top spring seat by being fitted into a radially inner circumference portion of said top spring seat and comprises a cover side rotation prevention portion (120) forming cover side rotation prevention surfaces (121, 122) which are surfaces enable to contact with said top spring seat in both rotational directions about said top seat axis so that said upper end of said dust cover does not relatively rotate about said top seat axis over said top spring seat in a status that said upper end of said dust cover is fitted into said radially inner circumference portion of said top spring seat, and said top spring seat comprises a seat side rotation prevention portion (110) forming seat side rotation prevention surfaces (111, 112) which are surfaces enable to contact with said cover side rotation prevention surfaces (121, 122).

The suspension device for a vehicle according to the present invention is formed between a wheel and a vehicle body, and comprises a shock absorber, a coil spring and a dust cover. The coil spring is disposed between a top spring seat in a shape of a ring, which is disposed on the side of a structure supporting the vehicle body, and a bottom spring seat in a shape of a ring, which is disposed on a cylinder sheath side of the shock absorber. The coil spring supports a vehicle weight, and absorbs an impact. The shock absorber is disposed between the wheel and the vehicle body, and attenuates a vibration of the coil spring. The dust cover is formed in a shape of bellows tube, is disposed between the shock absorber and the coil spring, and protects an oil seal and/or a piston rod of the shock absorber from foreign matters, such as sand, for instance.

The top spring seat is formed so that a supporting surface which supports an upper end of the coil spring through an insulator is inclined to an axis of the shock absorber and is disposed rotatably about a top seat axis inclined to the axis of the shock absorber. Therefore, when a steering operation is performed, the top spring seat can be rotated accordingly.

A lower end of the dust cover is fitted into a sheath side member fixed and disposed on the cylinder sheath side and thereby attached to the sheath side member rotatably about an axis of the shock absorber. An upper end of the dust cover is fitted into a radially inner circumference portion of the top spring seat and thereby attached to the top spring seat. Therefore, the dust cover can be easily attached by fitting (an interdigitation).

For this reason, no special jointing member for holding the dust cover in a predetermined position is necessary. For instance, the upper end of the dust cover is formed so that it can be fitted into a radially inner circumference portion of the top spring seat along the circumferential direction by its own elastic deformation and restoration, by being pushed into the radially inner circumference portion of the top spring seat. Moreover, for example, the lower end of the dust cover is formed so that it can be fitted into the sheath side member along the circumferential direction by its own elastic deformation and restoration, by being pushed into the sheath side member.

When the upper end of the dust cover top is attached to the top spring seat and the lower end is attached to the sheath side member by such an interdigitation, the dust cover rotates together when the top spring seat rotates about the top seat axis (around a rotation axis of the top spring seat).

The top spring seat repetitively rotates about the top seat axis in response to a force from a winding seat portion of the coil spring, whenever an expansion and contraction movement of the coil spring (expansion and contraction movement of the shock absorber) is made.

When the dust cover slides over the top spring seat at this time, the dust cover rotates in one direction or the other, and the position of the dust cover with respect to the top spring rotationally gradually shifts from its initial position. Since the top spring seat repetitively rotates about the top seat axis inclined to the axis of the shock absorber, load acting on the dust cover becomes uneven and a strain arises in the dust cover in association with the shift of the rotational position of the dust cover.

Therefore, in accordance with the present invention, the upper end of the dust cover comprises a cover side rotation prevention portion forming cover side rotation prevention surfaces which are surfaces enable to contact with the top spring seat in both rotational directions about the top seat axis so that the upper end of the dust cover does not relatively rotate about the top seat axis over the top spring seat in a status that the upper end of the dust cover is fitted into the radially inner circumference portion of the top spring seat. On the other hand, the top spring seat comprises a seat side rotation prevention portion forming seat side rotation prevention surfaces which are surfaces enable to contact with the cover side rotation prevention surfaces.

Therefore, the position of the dust cover with respect to the top spring seat does not shift by the contact of the cover side rotation prevention surfaces and the seat side rotation prevention surfaces. Thereby, since the dust cover can be maintained at a proper position, a trouble such as expansion and contraction of the dust cover in a status that the dust cover is distorted can be prevented. As a result, the endurance of the dust cover can be improved.

In addition, although the symbols used in an embodiment are assigned to the configuration of the invention corresponding to the embodiment in parenthesis in the above-mentioned illustration, in order to help understanding of the present invention, each constituent elements of the invention are not limited to the embodiment specified with the above-mentioned symbols.

DESCRIPTION OF THE INVENTION

Figure 1:
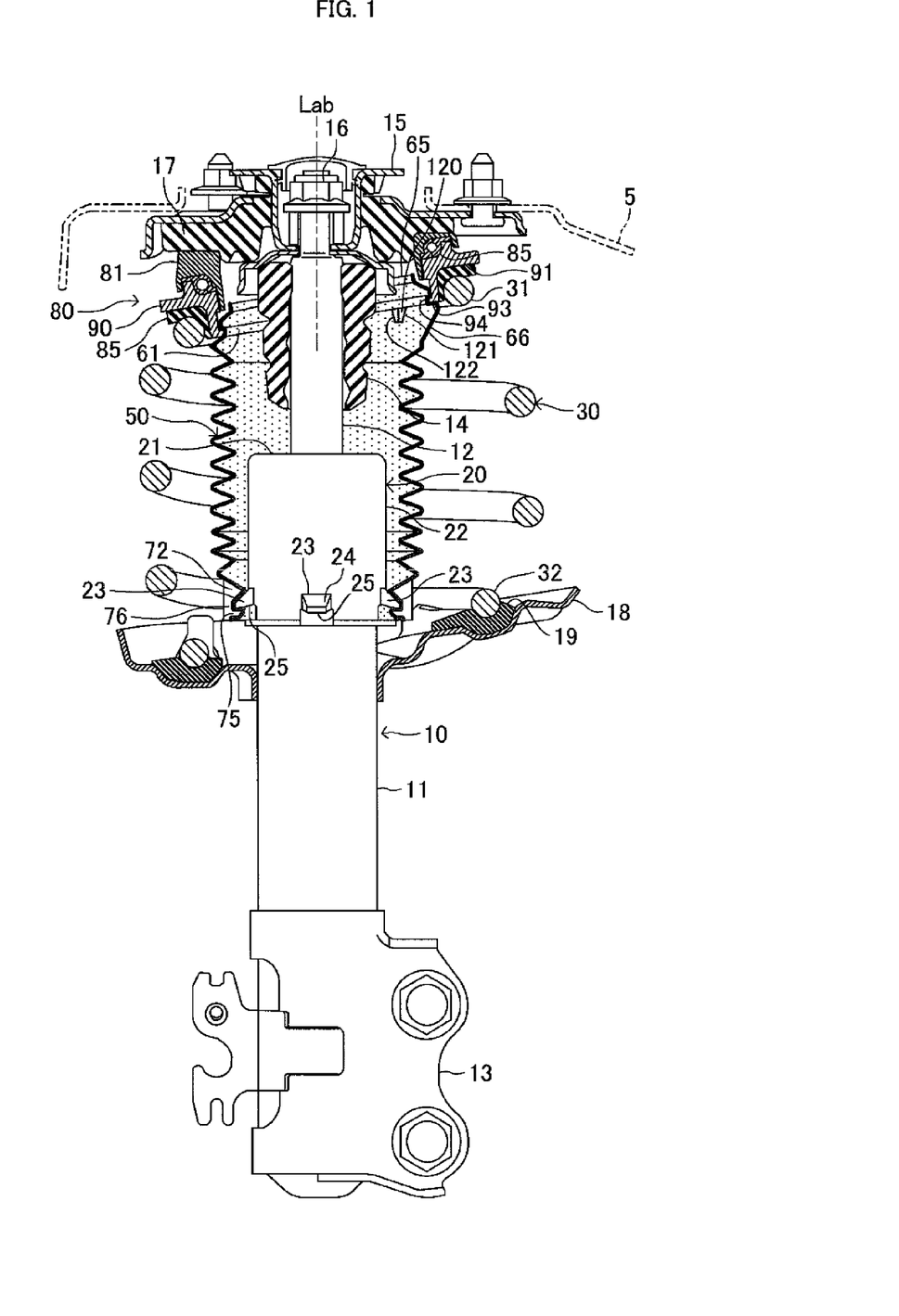
FIG. 1 is a schematic diagram of a suspension device for a vehicle according to the present embodiment.

Hereafter, a suspension device for a vehicle according to one embodiment of the present invention will be explained using drawings. FIG. 1 is a schematic diagram of a suspension device for a vehicle according to the present embodiment. The suspension device for a vehicle (hereafter, will be simply referred to as a suspension device) is a strut-type suspension device for suspending a front wheel which is a steered wheel from a vehicle body. The suspension device comprises a shock absorber 10, a coil spring 30 which is a suspension spring, and a dust cover 50. In FIG. 1, the dust cover 50 is displayed in gray (a dotted area) so that it may be easy to distinguish from other parts.

The shock absorber 10 comprises a cylinder 11 and a piston rod 12 having a piston (not shown), which moves back and forth in the cylinder 11, at the end. A lower end of the cylinder 11 is fastened to a wheel side member (knuckle) which is not shown through a bracket 13. A cylindrical bump stopper cap 20 is pressed downward and fixed at an upper end of the cylinder 11.

The bump stopper cap 20 has a ring-like plate surface 21 facing a bound stopper 14 which will be mentioned later, at the top thereof. The bump stopper cap 20 is a member which supports the load of the bound stopper 14 on the ring-like plate surface 21 and restricts a stroke movement of the shock absorber 10, when the shock absorber 10 makes a stroke movement to a predetermined position in a contraction direction.

In addition, in the present specification, directions such as upper and lower (top and bottom) represent directions in a status that the suspension device is properly disposed in the vehicle body 5.

The bump stopper cap 20 is formed integrally with a protrusion 23 projecting outward in a radial direction from a circular-cylinder outer circumference surface 22. As this protrusion 23, a plurality of (for instance, four) protrusions 23 are formed at a predetermined interval along the circumferential direction on the lower side of the circular-cylinder contour surface 22 of the bump stopper cap 20. Although will be mentioned later, this protrusion 23 is fitted into the lower end of the dust cover 50 and rotatably supports the lower end so that it may not escape in an up-and-down direction.

The upper end of the piston rod 12 is fastened to an upper support 15 with a nut 16. The upper support 15 is fastened to the vehicle body 5, and a cylindrical top spring seat unit 80 is formed in the back side. The top spring seat unit 80 comprises a base portion 81 non-rotatably fitted into the step portion of a back side member 17 of the upper support 15, a ring-like top seat portion 90 which supports the coil spring 30 through the insulator 85, and a strut bearing 85 which is disposed between the base portion 81 and the top seat portion 90 and supports the top seat portion 90 rotatably to the base portion 81.

Figure 2:
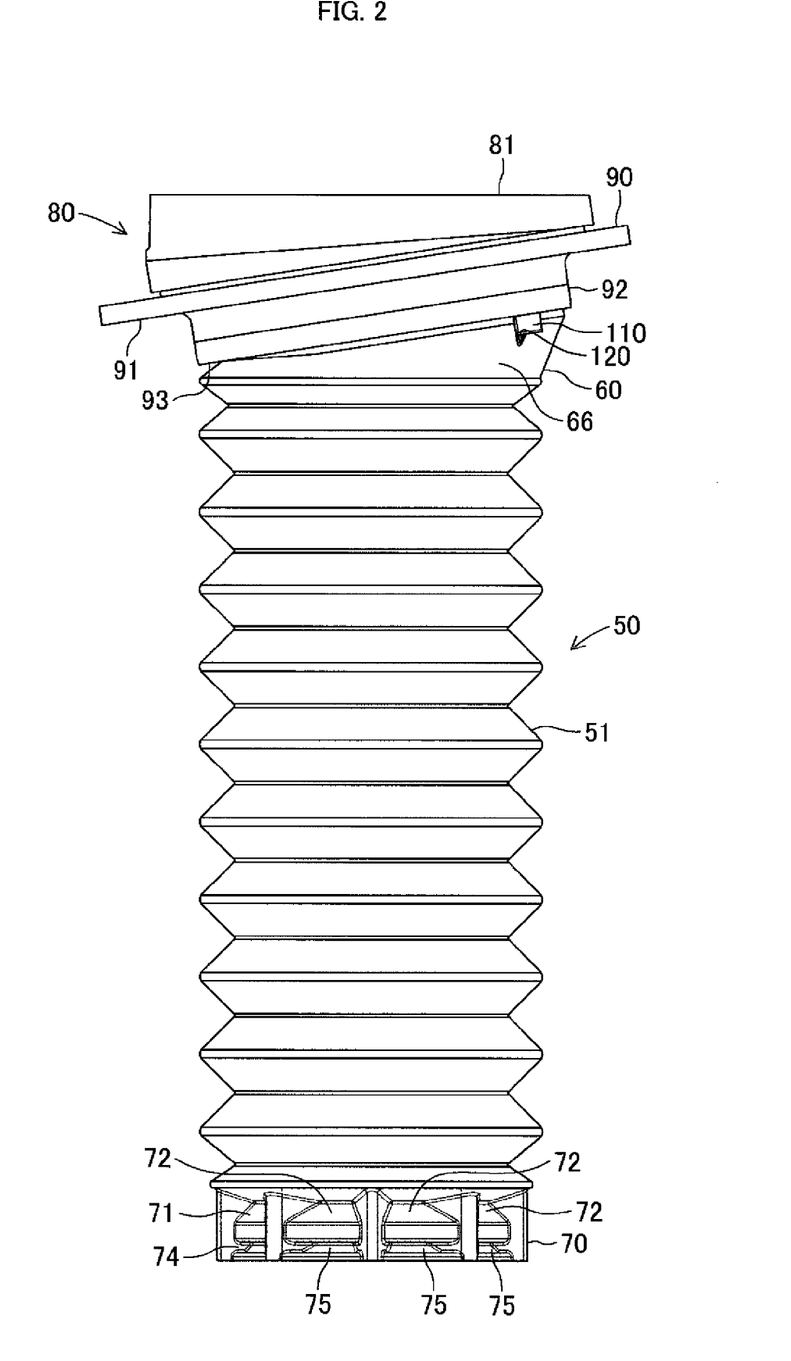
FIG. 2 is a front elevation view for showing a status that a dust cover is fitted into a top spring seat unit.
Figure 3:
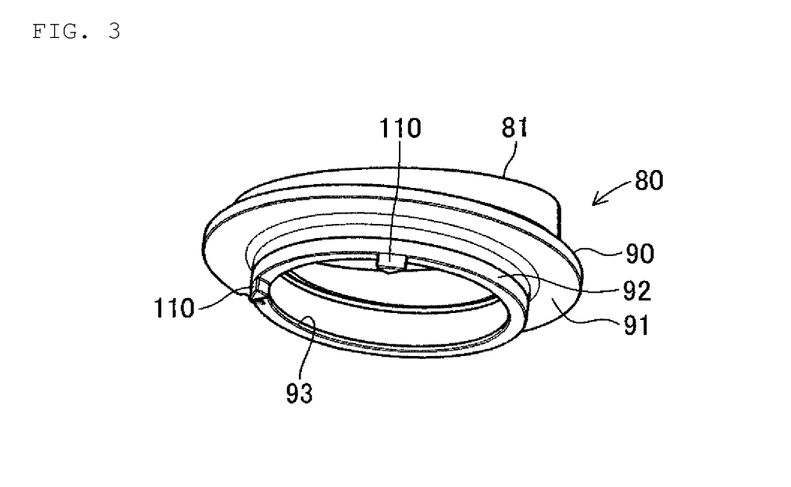
FIG. 3 is a perspective view of a top spring seat unit.

Although the base portion 81 is formed in a shape of an approximately circular cylinder as shown also in FIG. 2 and FIG. 3, its height dimension (dimension in an axial direction) of the circular-cylinder wall is not constant in a circumferential direction and has a shape obtained by cutting the circular-cylinder wall aslant to its axis. Thereby, a ring-like plane surface 91 to which the insulator 85 in the top seat portion 90 tightly sticks forms a slope which has a predetermined tilt angle to a surface which intersects perpendicularly with the axis Lab of the shock absorber 10. Therefore, a surface which intersects perpendicularly with a rotation axis of the top seat portion 90 intersects aslant to the axis Lab of the shock absorber 10.

The top seat portion 90 is equivalent to the top spring seat according to the present invention, and a circular-cylinder wall 92 erected perpendicularly (with respect to the ring-like plane surface) from a radially inner end of the ring-like plane surface 91 is formed. At the end of the circular-cylinder wall 92, a small-diameter step portion 93 which projects inward in a radial direction and has its inner diameter narrower than that of the circular-cylinder wall 92 is formed. The shape of the inner circumference portion of the small-diameter step portion 93 is formed circularly. This small-diameter step portion 93 retains the dust cover 50 rotatably about the axis in a status that the upper end of the dust cover 50 is fitted into the small-diameter step portion 93.

In the upper portion of the piston rod 12, the bound stopper 14 is fixed and disposed at a location surrounded by the inner circumference surface of the top spring seat unit 80.

A bottom spring seat 18 in a shape of a ring is fixed to the outer circumference surface of the cylinder 11 by welding. The coil spring 30 is mounted in a status that it was compressed between the top seat portion 90 of the top spring seat unit 80 and the bottom spring seat 18. The winding seat portion 31 (referred to as the upper winding seat portion 31) on the side of the upper end of the coil spring 30 is supported by the top seat portion 90 through the insulator 85, and the winding seat portion 32 (referred to as the lower winding seat portion 32) on the side of the lower end of the coil spring 30 is supported by the bottom spring seat 18 through the insulator 19.

Each of the insulators 19 and 85 is molded from a rubber material which has a predetermined hardness. The coil spring 30 is supported through the insulator 85 so that the upper winding seat portion 31 may not slide over the top seat portion 90 and it is supported through the insulator 19 so that the lower winding seat portion 32 may not slide over the bottom spring seat 18.

The dust cover 50 covers an outer circumference (especially, the piston rod 12 and the portion in which the piston rod 12 moves back and forth from the cylinder 11) of the shock absorber 10 in order to protect the oil seal and the piston rod 12 of the shock absorber 10 from foreign matters, such as sand, and it is disposed between the shock absorber 10 and the coil spring 30. The dust cover 50 integrally comprises a bellows tube portion 51, a top connecting portion 60 formed continuously from the upper end of the bellows tube portion 51, and a bottom connecting portion 70 formed continuously from the lower end of the bellows tube portion 51, as shown in FIG. 1 and FIG. 2. The top connecting portion 60 is fitted into and connected with the small-diameter step portion 93 formed on the top seat portion 90 of the top spring seat unit 80. Moreover, the bottom connection portion 70 is fitted into and connected with the protrusion 23 formed on the bump stopper cap 20.

A depressed groove 61 which is concave inward in a radial direction and has a cross-section a in a shape of a U character to be fitted into the small-diameter step portion 93 of the top seat portion 90 is formed along the circumferential direction at an orientation matching the incline of the small-diameter step portion 93. The depressed groove 61 is formed in a dimension which can surround three surfaces (an inner circumference surface, an upper surface and a lower surface) of the small-diameter step portion 93. Therefore, in a status that the small-diameter step portion 93 has entered into the depressed groove 61, the dust cover 50 is retained not to escape from the small-diameter step portion 93 in an axial direction (axial direction of the top seat portion 90).

In the top connection portion 60, an insertion circular-cylinder portion 65 is formed on the end side from the depressed groove 61, and an incline circular-cylinder portion 66 is formed on the side of the bellows tube portion 51 from the depressed groove 61. The insertion circular-cylinder portion 65 is formed in a shape of tapering off so that the circular-cylinder outer diameter at the end is smaller than the inner diameter of the small-diameter step portion 93 of the top seat portion 90. The incline circular-cylinder portion 66 is formed in a shape of a circular-cylinder tube which connects the upper end of the bellows tube portion 51 and the depressed groove 61 successively.

The dust cover 50 is fitted into the top seat portion 90 by pushing upward the insertion circular-cylinder portion 65 inside the top seat portion 90. Since the cylindrical surface is formed in the shape of skirt spreading so that the diameter becomes larger toward a base side, the insertion circular-cylinder portion 65 elastically and smoothly deformed to the inner side in a radial direction and strides over the small-diameter step portion 93 in a process in which the dust cover 50 is pushed into the top seat portion 90. And, once the insertion circular-cylinder portion 65 has stridden over the small-diameter step portion 93, the small-diameter step portion 93 will enter into the depressed groove 61, and the deformation of the dust cover 50 (deformation of the insertion circular-cylinder portion 65) will be restored.

Thereby, the small-diameter step portion 93 is stored in the depressed groove 61, and the upper end side of the dust cover 50 is fitted into the top seat portion 90. The dust cover 50 is retained not to escape from the top seat portion 90 by this fitting (interdigitation). Therefore, a fitting portion for attaching the upper end side of the dust cover 50 to the top seat portion 90 is constituted by the depressed groove 61 and the small-diameter step portion 93. In addition, the dust cover 50 is rotatable about an axis (around a rotation axis of the top seat portion 90) with respect to the top seat portion 90, in a case where a rotation prevention portion 100 which will be mentioned later is not formed.

In the bottom connection portion 70 of the dust cover 50, an upper depressed portion 71 and a lower depressed portion 74 which are fitted with the protrusion 23 formed in the bump stopper cap 20 are formed. As the upper depressed portion 71, a plurality of upper depressions 72 which are concave inward in a radial direction are formed at a predetermined interval along the circumferential direction. Moreover, the lower depressed portion 74 is formed under the upper depressed portion 71. As the lower depressed portion 74, a plurality of lower depressions 75 which are concave inward in a radial direction are formed so that they face the upper depressions 72.

The upper depressions 72 are formed so that they are concave inward in a radial direction with a cross-section in a shape of a V character. The lower depressions 75 are formed so that they are concave inward in a radial direction with a cross-section in a shape of a U character.

The protrusion 23 formed in the bump stopper cap 20 has an incline protrusion surface 24 extending obliquely downward and radially outward from the circular-cylinder outer circumference surface 22 of the bump stopper cap 20. The lower end surface 25 of the protrusion 23 is formed approximately in a horizontal direction.

If the bottom connection portion 70 of the dust cover 50 is seen from an inside viewpoint, a depression 76 (referred to as a middle depression 76) which is concave outward in a radial direction will be formed between the upper depression 72 and the lower depression 75. The dust cover 50 is attached to the bump stopper cap 20 by arranging the protrusion 23 of the bump stopper cap 20 in this middle depression 76.

The dust cover 50 is fitted into the bump stopper cap 20 by being pushed downward, in a status that the bottom connection portion 70 is arranged so as to cover the upper end outer circumference of the bump stopper cap 20. In this case, the lower depression 75 elastically deformed outward (pushed out) in a radial direction while smoothly sliding over the incline protrusion surface 24 of the protrusion 23 and strides over the protrusion 23 in a process in which the dust cover 50 is pushed downward. And, once the lower depression 75 has stridden over the protrusion 23, the protrusion 23 will enter into the middle depression 76, and the deformation of the dust cover 50 (deformation of the lower depression 75) will be restored.

Thereby, the protrusion 23 is stored in the middle depression 76, and the lower end side of the dust cover 50 is fitted into the bump stopper cap 20. By this interdigitation (fitting), the dust cover 50 is retained rotatably about an axis with respect to the bump stopper cap 20. Therefore, a fitting portion for attaching the lower end side of the dust cover 50 to the cylinder 11 of the shock absorber 10 (this is because the bump stopper cap 20 is fixed to the cylinder 11) is constituted by the middle depression 76 and the protrusion 23.

When the shock absorber 10 expands and contracts, the coil spring 30 also expands and contracts accordingly. When the coil spring 30 makes this expansion and contraction movement, the upper winding seat portion 31 and lower winding seat portion 32 make a repetitive rotational movement about a coil axis relatively. The upper winding seat portion 31 and the lower winding seat portion 32 of the coil spring 30 are respectively fixed to the top seat portion 90 and the bottom spring seat 18 through the insulators 85 and 19 repetitively so that they may not slide over these seats. Therefore, when the coil spring 30 makes an expansion and contraction movement, the top seat portion 90 is made to repetitively rotate about its own axis in connection therewith.

The upper end side of dust cover 50 is attached to the top seat portion 90 by the interdigitation along the circumferential direction, and the lower end side is attached to the bump stopper cap 20 by the interdigitation along the circumferential direction. For this reason, the upper end side of dust cover 50 can rotate about an axis with respect to the top seat portion 90, and the lower end side can rotate about an axis with respect to the bump stopper cap 20. In case of such a configuration, as mentioned above, whenever the top seat portion 90 is made to repetitively rotate about an axis according to the input from the top winding seat portion 31 of the coil spring 30, the position of the dust cover 50 with respect to the top seat portion 90 shifts in one rotational direction or the other. Thereby, the load acting on the dust cover 50 becomes uneven along a circumferential direction, and a strain arises in the dust cover 50. When the shock absorber 10 expands and contracts by a vertical vibration of the vehicle body 5 in this status, the dust cover 50 will be expanded and contracted in its strained status, and its endurance will fall.

Figure 4:
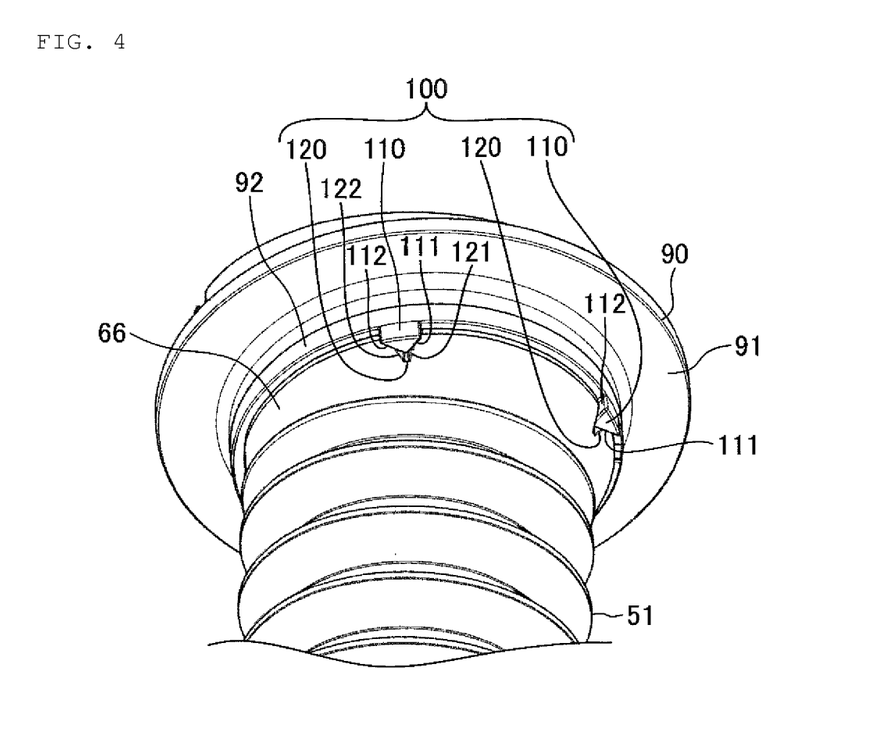
FIG. 4 is a perspective view of a rotation prevention portion.
Figure 5:
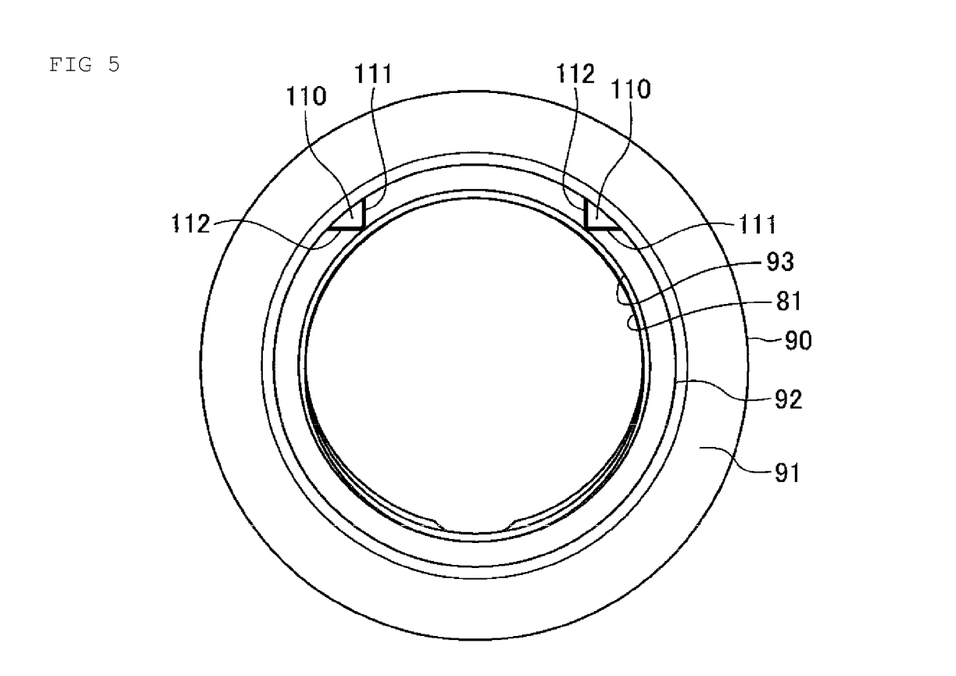
FIG. 5 is a top view of a top spring seat unit.
Figure 6:
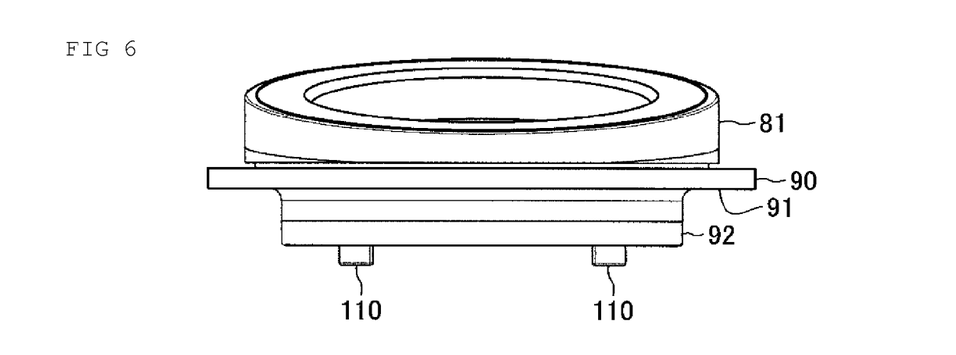
FIG. 6 is a front elevation view of a top spring seat unit.

Then, especially, as shown in FIG. 4, the suspension device according to the present embodiment comprises a rotation prevention portion 100 so that the dust cover 50 cannot relatively rotate about an axis of the top seat portion 90 with respect to the top seat portion 90. The rotation prevention portion 100 is constituted by two convex portions 110 formed on the top seat portion 90 and two concave portions 120 formed in the connection portion 60 of the dust cover 50. In this embodiment, the convex portion 110 is a triangular prism-like object integrally erected downward (axial direction of the top seat portion) from the lower surface of the circular-cylinder wall 92 of the top seat portion 90, and a lateral face which extends in a radial direction to an edge of the small-diameter step portion 93 is formed.

On the other hand, the concave portion 120 is a V character-like groove concave inward in a radial direction in a shape of a V character, which has been formed parallel to the axial direction of the top seat portion 90 with a position and size for enabling to be fitted with the convex portion 110 on the lateral face of the connection portion 60 in the dust cover 50. Therefore, groove surfaces 121, 122 which face the lateral faces 111, 112 formed in the convex portion 110 are formed in the concave portion 120. In addition, backsides of the groove surfaces 121, 122 are shown in FIG. 1. The convex portion 110 is equivalent to the seat side rotation prevention portion according to the present invention, and the lateral faces 111, 112 are equivalent to the seat side rotation prevention surfaces according to the present invention. Moreover, the concave portion 120 is equivalent to the cover side rotation prevention portion according to the present invention, and the groove surfaces 121, 122 are equivalent to the cover side rotation prevention surfaces according to the present invention.

The dust cover 50 is attached to the top seat portion 90 by pushing upward the insertion circular-cylinder portion 65 inside the top seat portion 90, in a status that the concave portion 120 and the convex portion 110 of the top seat portion 90 are aligned. At this time, while the small-diameter step portion 93 enters into the depressed groove 61 of the dust cover 50 and thereby the dust cover 50 is retained not to escape from the top seat portion 90, the convex portion 110 of the top seat portion 90 is inserted into the concave portion 120 of the dust cover 50 and the lateral faces 111, 112 of the convex portion 110 and the groove surfaces 121, 122 of the concave portion 120 mutually face around the axis of the top seat portion 90.

Thereby, even if the dust cover 50 tends to rotate about an axis with respect to the top seat portion 90, the lateral faces 111, 112 of the convex portion 110 contact with the groove surfaces 121, 122 of the concave portion 120 and thereby a rotation about an axis is prevented. Therefore, the top connection portion 60 in the dust cover 50 is fitted non-rotatably about the axis with respect to the top seat portion 90. In addition, the lateral faces 111, 112 formed in the convex portion 110 and the groove surfaces 121, 122 formed in the concave portion 120 may be configured to always contact mutually, or they may be configured to come to contact mutually when the dust cover 50 rotates slightly about an axis with respect to the top seat portion 90 and thereby prevent a further rotation.

In accordance with the suspension device for a vehicle according to the present embodiment explained above, the dust cover 50 can be easily attached and the dust cover 50 can be prevented from rotating about an axis with respect to the top seat portion 90, by pushing the both ends of the dust cover 50 into the top seat portion 90 and the bump stopper cap 20 (sheath side member). For this reason, even if the top seat portion 90 rotates about an axis by the expansion and contraction of the shock absorber 10, the position of the dust cover 50 with respect to the top seat portion 90 does not shift from its initial position. Therefore, since the dust cover 50 can be always maintained in a proper position, a trouble such as the expansion and contraction of the dust cover 50 in a status that the dust cover 50 is distorted can be prevented. As a result, the endurance of the dust cover 50 can be improved.

As mentioned above, although the embodiment according to the suspension device for a vehicle of the present invention has been described, the present invention is not limited to the above-mentioned embodiment, and various modifications are possible unless they deviate from the objective of the present invention.

For example, although the configuration wherein the lower end of the dust cover 50 is connected with the bump stopper cap 20 is adopted in the present embodiment, it is not necessarily to be connected with the bump stopper cap 20. A configuration wherein a fitting piece (not shown) is disposed in the bottom spring seat 18 or the circular-cylinder outer circumference surface of the cylinder 11 and the lower end of the dust cover 50 is rotatably fitted with this fitting piece can also be adopted.

Moreover, although the convex portion 110 formed in the top seat portion 90 and the concave portion 120 formed in the dust cover 50 constitute the rotation prevention portion 100 in the present embodiment, alternatively, for instance, the rotation prevention portion may be constituted by forming a concave portion in the top seat portion 90 and forming a convex portion in the dust cover 50, etc. Moreover, the numbers, shapes, position and so on of a convex portion and a concave portion can be set arbitrarily.

REFERENCE SIGNS LIST

10: shock absorber, 11: cylinder, 12: piston rod, 14: bound stopper, 18: bottom spring seat, 19: insulator, 20: bump stopper cap, 23: protrusion, 30: coil spring, 31: upper winding seat portion, 32: lower winding seat portion, 50: dust cover, 51: bellows tube portion, 60: top connection portion, 61: depressed groove, 65: insertion circular cylinder, 66: incline circular-cylinder portion, 70: bottom connection portion, 71: upper depressed portion, 72: upper depression, 75: lower depression, 74: lower depressed portion, 76: middle depression, 80: top spring seat unit, 81: base portion, 85: insulator, 85: strut bearing, 90: top seat portion, 91: ring-like plane surface, 92: circular-cylinder wall, 93: small-diameter step portion, 100: rotation prevention portion, 110: convex portion, 111, 112: lateral face, 120: concave portion, 121, 122: groove surface, Lab: axis.

What is claimed is:

1. A suspension device for a vehicle comprising:
a shock absorber disposed between a wheel and a vehicle body,
a coil spring disposed between a top spring seat in a shape of a ring and a bottom spring seat in a shape of a ring, said top spring seat is disposed on the side of a structure which supports said vehicle body and said bottom spring seat is disposed on a cylinder sheath side of said shock absorber, and
a dust cover disposed between said shock absorber and said coil spring, said dust cover is elastically deformable and is in a shape of bellows tube,
wherein:
said top spring seat is formed so that a supporting surface which supports an upper end of said coil spring through an insulator is inclined to an axis of said shock absorber and said top spring seat is disposed rotatably about a top seat axis inclined to said axis of said shock absorber,
a lower end of said dust cover is attached to a sheath side member rotatably about an axis of said shock absorber, by being fitted into said sheath side member fixed and disposed on said cylinder sheath side,
an upper end of said dust cover is attached to said top spring seat by being fitted into a radially inner circumference portion of said top spring seat and comprises a cover side rotation prevention portion forming cover side rotation prevention surfaces which are surfaces enable to contact with said top spring seat in both rotational directions about said top seat axis so that said upper end of said dust cover does not relatively rotate about said top seat axis over said top spring seat in a status that said upper end of said dust cover is fitted into said radially inner circumference portion of said top spring seat, and said top spring seat comprises a seat side rotation prevention portion forming seat side rotation prevention surfaces which are surfaces enable to contact with said cover side rotation prevention surfaces.

\* \* \* \* \*